Oct. 27, 1959  W. S. HADDOCK  2,909,851
EDUCATIONAL GAME APPARATUS
Filed April 22, 1958  2 Sheets-Sheet 1

INVENTOR.
WILLIAM S. HADDOCK
BY
Lynn H. Latta
ATTORNEY

Oct. 27, 1959  W. S. HADDOCK  2,909,851
EDUCATIONAL GAME APPARATUS
Filed April 22, 1958  2 Sheets-Sheet 2

INVENTOR.
WILLIAM S. HADDOCK
BY Lynn H. Latta
ATTORNEY

United States Patent Office 2,909,851
Patented Oct. 27, 1959

2,909,851

EDUCATIONAL GAME APPARATUS

William Stanley Haddock, Los Angeles, Calif.

Application April 22, 1958, Serial No. 730,095

12 Claims. (Cl. 35—9)

This invention relates to child educational apparatus and in general aims to provide an apparatus for teaching a child certain elementary knowledge such as simple sums in arithmetic, the spelling of simple words, and elementary reading.

The invention contemplates an apparatus having mechanism for computing and presenting an answer in response to the insertion into the apparatus of actuator pieces bearing the components of the answer or of the problem calling for the answer. The actuator pieces are designed to represent children's blocks in a general way. As an example of the type of problem contemplated by the invention, the actuator pieces may represent the components of the problem "2 & 2=", and actuator pieces bearing the legends "2", "&" and "2" are inserted into the apparatus. The invention provides for the mechanical actuation of mechanism in the apparatus wherein the three problem component pieces are adapted to successively act upon an answer bearing unit in a selective manner such as to effect the movement of this unit to an answer displaying position, in which an answer borne by the unit is made visible through a display window in the housing of the apparatus.

An object of the invention is to provide an apparatus of the type outlined above, of relatively compact and sturdy construction, embodying a plurality of answer bearing units normally concealed in a housing, and embodying a plurality of problem component actuator pieces adapted to be inserted into the housing and operable by such insertion to release for movement to a display position, the unit bearing the answer to the problem represented by the problem components.

A further object is to provide, in such an apparatus, a series of actuator pieces each bearing a plurality of problem components and a corresponding plurality of actuator parts.

A further object is to provide such an apparatus having sounding means for announcing the arrival of an answer bearing unit to the display position in a manner to attract the interest of a child.

More generally, the invention contemplates an educational apparatus of the type outlined above, which is operable in a manner to appeal to a child as a plaything or toy and to thereby stimulate the child's interest in the problem and its answer.

Other objects and advantages will become apparent in the ensuing specification and appended drawings in which.

Figure 1:
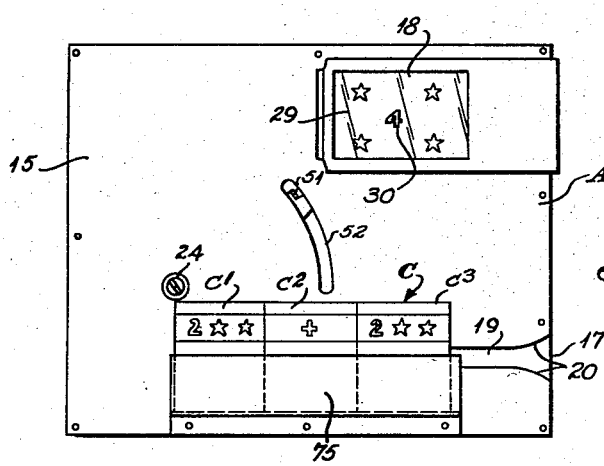
Fig. 1 is a plan view of an educational toy embodying the invention.

Referring now to the drawings in detail, I have shown therein, as an example of one form in which the invention may be embodied, an educational toy embodying, in general, a housing A, mechanism B within the housing, embodying primary a series of answer bearing units, and a series of problem component actuator pieces indicated generally at C.

The housing A includes a back panel 10, side wall members 11 and 12 (Fig. 8) end wall members 13 and 14, and a front panel 15 in the form of a cover which may be detachably connected, as by screws, to flanges 16 on the forward margins of the side and end wall members 11—14. End wall member 13 is cut away to provide a mouth 17 through which the actuator pieces C can be inserted into the housing. The front panel 15 is provided with a display window 18 through which an answer carried by one of the answer bearing units of mechanism B becomes visible when the selected unit is actuated to the display position indicated at (4) in Fig. 3 and Fig. 8.

Panel 15 has a slide slot 19 beginning with a flaring mouth 20 which is in communication with the mouth 17, and extending to a length such as to accommodate a series of the actuator pieces c1, c2 and c3 when moved to home positions in which they have actuated the selected answer bearing unit to move the same to limit the movements of the actuator pieces by engagement with the first piece c1 of the series. Attached to the bottom panel 10 is a slideway or guide-way 21 which may have a flaring initial portion 22 to guide an actuator piece into position in which it rides against the slideway 21.

The mechanism B comprises a series of answer bearing units in the form of levers 23 each pivoted upon a common pivot 24 mounted on the back panel 10 and each embodying an arm 25 (which is broadened at its outer end to provide an answer bearing head 26) and a tail portion 27 projecting from pivot 24 in the opposite direction from arm 25. The head 26 (Fig. 3) is formed with a pair of retainer flanges 28 in overhanging spaced relation thereto so as to provide slots to receive the edges of a printed card 29 upon which an answer is imprinted (e.g. the numeral 4 indicated at 30 in Fig. 1).

Figures 8, 9:
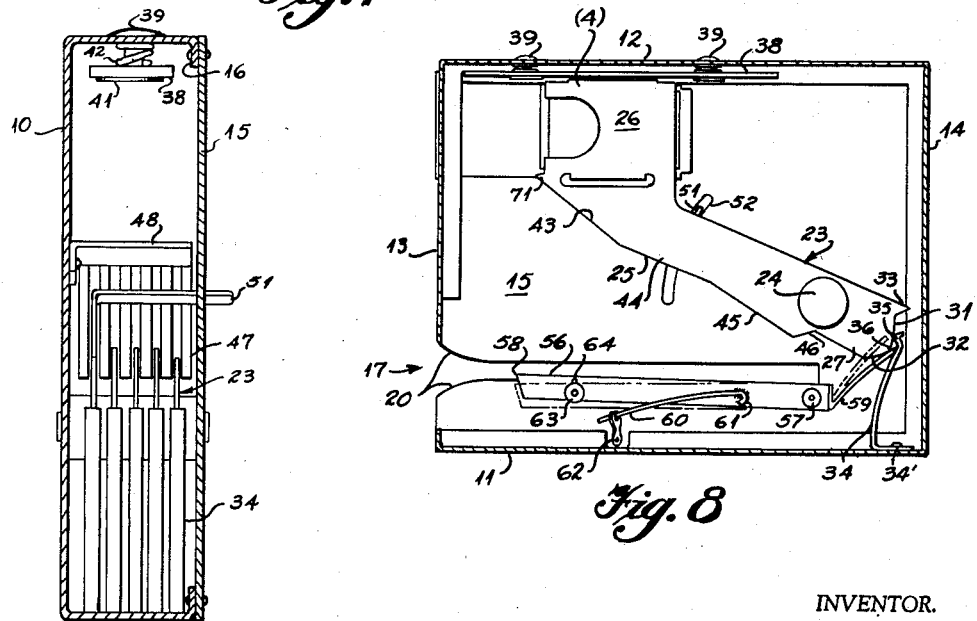
Fig. 8 is an inverted plan sectional view taken on the line 8—8 of Fig. 6.
Fig. 9 is a sectional view taken on the line 9—9 of Fig. 2.

The tail 27 of the answer bearing unit (Fig. 8) is provided, at its end, with a bearing face 31, a camming face 32 and a detent finger 33. A series of leaf springs 34, secured as at 34' to side wall member 11, are provided at their free ends with V tips 35 which bear yieldingly against the ends of respective tail members 27, being in engagement with bearing edges 31 when the levers 23 are in their normal retracted positions, and bearing against the camming edge 32 thereof (as illustrated in Fig. 8) when the respective lever is in display position. Each tip 35 is adapted to have an over-center action passing over a high point 36 defined between the edges 31 and 32 of its respective lever. The bearing edge 31 is spiralled outwardly (with respect to pivot 24) toward the point 36 so as to react with the spring tip 35 in yieldingly retaining the respective lever normally in a retracted position. The respective camming edge 35 is spiralled outwardly about pivot 24 toward the tip 36 in the opposite direction so as to coact with the respective spring tip 35 with a camming action in which the pressure of the tip 35 will be effective to move the respective lever 23 from an on-center dwell position to its display position shown in Fig. 8.

Secured to end wall 13 adjacent mouth 17 is a stop 37 against which heads 26 are adapted to engage in order to limit the movement of the respective levers 23 away from display positions, and to hold the levers in their normal retracted positions in which they are adapted to coact with the series of actuator pieces in proper succession.

In the display positions, the heads 26 are engaged against a sounding bar 38 which produces a bell-like sound when struck by one of the lever heads 26. Sounding bar 38 in mounted upon a pair of short studs 39 riveted or otherwise suitably secured in side wall member 12. Bar 38 has a pair of corresponding apertures 40 through which the studs 39 pass, the latter having respective heads 41 at their inner ends, against which the bar 38 is normally seated. Light coil springs 42 are interposed between the bar 38 and side wall member 12 in encircling relation to the respective studs 39, to yieldingly maintain the bar seated against the heads 41, springs 42 being highly yielding so as to permit the bar 38 to vibrate freely in order to give off its tone when struck.

Each of the levers 23, along its margin facing the slideway 21 and slot 20, has a series of camming edges 43, 44 and 45 for coaction with the actuator parts of actuator pieces C which will presently be described in detail. Beyond the camming edge 45, the forward edge of each lever is cut back with an offset at 46 to avoid interference between the tail part 27 of the lever and the innermost actuator piece.

Figure 6:
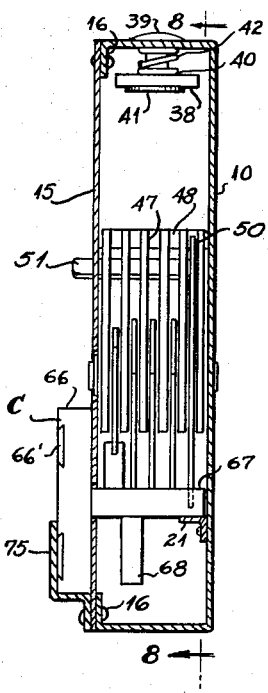
Fig. 6 is a sectional view taken on the line 6—6 of Fig. 2.
Figure 7:
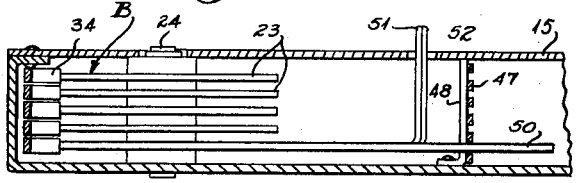
Fig. 7 is a fragmentary sectional view taken on the line 7—7 of Fig. 2.

Levers 23 are supported, adjacent heads 26, by a series of spaced guide fingers 47 which are mounted upon a post 48 secured to the back panel 10 (Figs. 2 and 6) the post 48 and fingers 47 cooperatively being in the form of a comb. The levers 23 slide in the slots defined between the fingers 47 and are thus supported in properly spaced relation to one another.

A re-setting lever 50 (Figs. 2 and 6) is pivoted on pivot 24 between the back panel 10 and the several levers 23, and is provided with an integral reset finger 51 projecting toward front panel 15 and through an arcuate slot 52 in the latter. The end of finger 51 projects beyond panel 15 sufficiently so that it can be engaged by the finger of an operator to move the lever 50 in a re-setting direction (indicated by arrow 53 in Fig. 2), whereupon the finger 51 will engage all of the levers 23 and any that have moved to the display position will be reset back to their retracted normal positions. Lever 50 has a tail portion formed with a cam edge 55 which engages the V-tip 35 of the rearmost spring 34 and is spiralled outwardly about pivot 24 to a point of maximum projection adjacent to the point indicated by numeral 55, whereby the action of the respective spring 34 will be such as to move the lever 50 back to its normal position shown in full lines in Fig. 2, in which position the finger 51 is retracted sufficiently to allow the levers 23 to move to their display positions without interference.

A blocking lever 56 (Fig. 8) is mounted by a pivot 57 to the inner face of cover 15 and is adapted to swing from a normal position shown in broken lines in Fig. 8 (in which position it does not obstruct the guide slot 19) to the full line position shown in Fig. 8 in which position the corner 58 of the lever at its free end is in obstructing relation to the slot as shown. A tail plate 59 secured to the pivoted end of lever 56 and extending into position to engage the tail extremities of levers 23, actuates the lever 56 in response to the tail pressure of the lever 23 that has reached the display position, as indicated by the full line showing in Fig. 8. When all levers 23 are in their retracted positions, the tail plate 59 may return to its position shown in broken lines permitting the lever 56 to return to its normal position shown in broken lines, under the yielding pull of a bow spring 60. Spring 60 is secured at 61 to lever 56 and its opposite end is anchored by a tie loop or hook 62 to the panel 15, with the spring bowed so as to yieldingly load the lever 56 toward its retracted, broken line position.

Limits of movement of lever 56 between the two positions shown in Fig. 8 are imposed by a rivet or the like 63 mounted in panel 15 and extending through an arcuate slot 64 in the lever 56 concentric with pivot 57.

Figure 4:
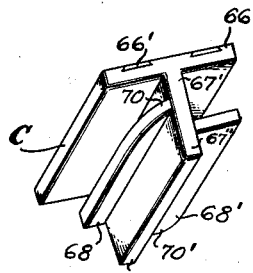
Fig. 4 is a perspective view, from the rear, of one of the answer bearing pieces.

Actuators C (Fig. 4) may be of molded plastic material, each including a display head 66, a trunk 67 projecting from the center of head 66 in a plane at right angles thereto, and one or more actuator wedges 68, 68' projecting laterally from trunk 67 in a plane or planes parallel to head 66. Where there are two of the wedges 68, 68', they are disposed in staggered relation, in different planes of different spacing from head 66 and from the end margin of trunk 67. Trunk 67 includes a neck portion 67', receivable in slot 19 of cover 15, and an end portion 67" adapted to bear against guideway 21. The cooperative guiding of the trunk 67 by slot 19 and guideway 21 properly positions an actuator wedge 68 or 68' with reference to the camming edges 43, 44 and 45 of a respective answer bearing lever 23. The spacing of the respective wedge 68 or 68' from the end portion 67" of trunk 67 determines the proper height of the respective wedge from the back panel 10 (against which the said end margin of the trunk bears as the actuator piece is slid into the mechanism). Thus the height of a respective wedge above the end of trunk 67 determines its height with respect to the series of answer bearing levers B and consequently determines the selective engagement of one particular lever by the particular wedge.

Figure 2:
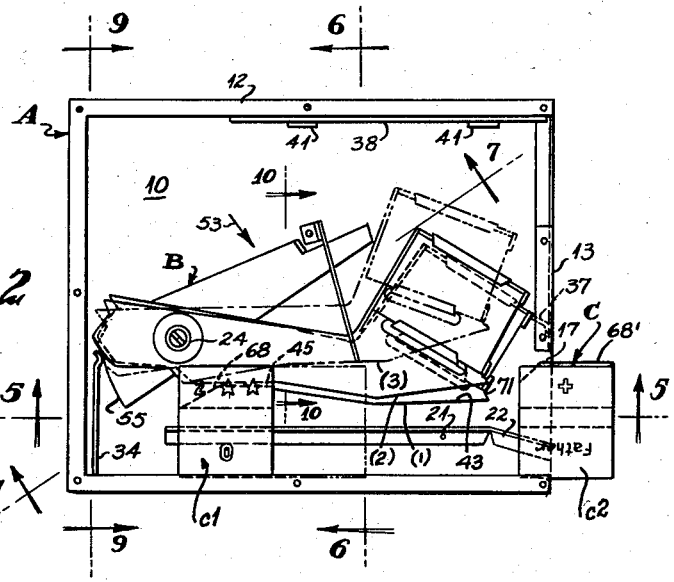
Fig. 2 is a plan view of the same with the front of the housing removed, with the first of a series of actuator pieces inserted into the apparatus to its home position and with the second of said series in a position of initial insertion into the housing.

On the outer face of head 66 is a problem component, displayed on a strip inserted into a slot 66', or adhesively attached. In Fig. 1 is shown a typical series of problem components comprising the designation "2" for the first piece $c1$, the plus sign for the second piece $c2$, and the designation "2" for the third piece $c3$ of the series. By trial and error, the child may insert the three pieces in the proper succession into the apparatus through the mouth 17 (the neck portion 67' of the trunk entering the mouth 20 of slot 19) and will successively push the pieces into their home position shown in Fig. 1. The third piece, although bearing the same designation as the first, cannot be inserted first because of the blocking effect referred to hereinafter. The wedge (e.g. 68) of the first actuator piece $c1$ has a starting point 70 approximately at the adjacent side face of trunk 67, sufficiently low to enter beneath the outer end of the camming edge 43 of the respective lever 23 when in the fully retracted position shown at (1) in Fig. 2. Said outer end of the camming edge 43 is defined by a corner 71 which will obstruct the starting end of any wedge of greater height than the minimum height wedge 68. For example, the wedge 68', having a starting end 70' which is partially squared and projects outwardly a substantial distance from the side of trunk 67, would engage the blocking corner 71 and could not be inserted beneath the camming edge 43. Upon movement of the first actuator piece $c1$ approximately one third the length of lever 23, it will exert a wedging effect against the camming edge 43 to shift the respective lever 23 outwardly approximately to the position indicated at (2). As the wedge 68 contacts the succeeding camming edges 44, and 45, it will ride along these edges without any substantial additional projecting movement of the lever 23, and as the first actuator piece $c1$ reaches the home position as shown in Fig. 2, it will support the respective lever in the (2) position in which the blocking corner 71 has been shifted to widen the entry space sufficiently to receive the respective wedge 68' of the next actuator piece c2, which is somewhat higher than the operative actuator wedge of the first piece c1. The second actuator piece may then be inserted as indicated in Fig. 2, and its wedge 68', upon engaging the cam edge 43 of the lever 23 will shift the lever to a third position indicated at (3) in Fig. 2, the wedge 68' coming to rest against the camming edge 44.

Figure 3:
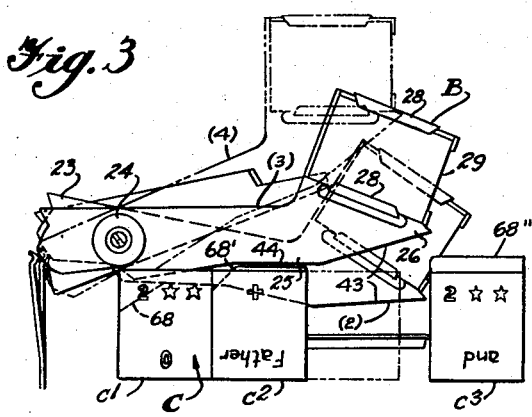
Fig. 3 is a plan view of the interior mechanism showing the second actuator piece moved to the home position, showing in full lines the third actuator piece in a position of initial insertion and showing in broken lines the home position of the third actuator piece and the resulting display position of the answer bearing part that has been actuated.
Figure 5:
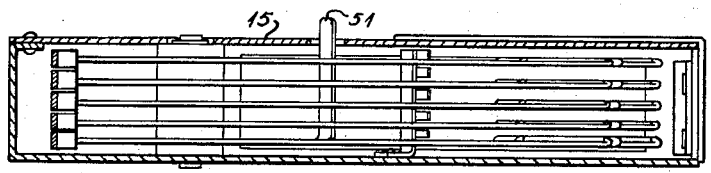
Fig. 5 is a sectional view of the apparatus taken on the line 5—5 of Fig. 2.

The blocking corner 71 of the lever is now shifted sufficiently to provide a gap that will receive the still higher wedge 68" of the third actuator piece c3 (Fig. 3) and as this third piece is inserted, its wedge 68" will engage the camming edge 43 (Fig. 3) and push the lever 23 an additional distance to a position (not shown) where the high point 36 of tail piece 27 of lever 23 will pass the high point of V-tip 35 of spring 34, whereupon the lever 23 will be propelled to the display position (4) indicated in broken lines in Fig. 3. As the head 26 strikes the sounding bar 38, a bell-like tone will be given off and the answer legend 30 carried by the head of the respective lever will appear in the window 18. Simultaneously, the tail cam of the lever 23 that has thus been shifted to display position will act against the tail plate 59 of lever 56 to shift the latter to its obstructing position shown in full lines in Fig. 8, so that no additional actuator pieces can be inserted into the apparatus.

To reset the apparatus, the actuator pieces are withdrawn from the slot 19 and the finger 51 is then engaged and pulled downwardly toward the slot 19, engaging the projected lever and returning it to its retracted position. Upon release of finger 51, lever 53 will be returned to its normal, inoperative position (1) shown in full lines in Fig. 2, by the action of the rear spring 34 against its tail cam 55.

The camming edges 43, 44 and 45 are arranged in a wave pattern which is such that the wedging action occurs primarily through engagement with the wedging edge 43 (where leverage is the greatest) and is relaxed as the respective actuator piece moves toward the pivot 24. Thus the resistance of the lever to being shifted toward the display position is reduced to a minimum. Also, this configuration facilitates the incremental shifting of the lever to an initial position by the first actuator piece and the subsequent supporting of the lever in that position without any further shifting in response to the movement of the actuator wedge 68 past camming edge 44 and into seating engagement with camming edge 45. By reference to the (2) position shown in Fig. 2, it will be apparent that the first actuator piece c1 in an intermediate stage of its movement, will have raised the lever to a position approximately midway between the (2) and (3) positions in passing the corner between camming edges 43 and 44, and that as it moves into supporting relation to camming edge 45, the lever will settle back to the (2) position, where it will remain supported by the wedge 68 as indicated in Figs. 2 and 3.

The apparatus of my invention can be utilized to teach spelling, mathematics, color, the identity of animals, birds, objects, etc., names, alphabet, the rhyming of words, geography and many other subjects. For example, to teach the spelling of the word "Cow," the letters "C," "O," and "W" would be imprinted upon the indicator heads of the first, second and third actuator pieces respectively, and the picture of a cow would be imprinted on the indicator head of the answer lever. Similarly, the colors red and yellow (or other selected colors) could be imprinted upon the indicator faces of the first and second of a series of actuator pieces, the word "make" on the third actuator piece of that series, and on the corresponding answer lever the color orange would appear. In arithmetic, in addition to the operations of addition, division and multiplication, the application of which is believed to be obvious, the apparatus could be used to teach multiples by showing the first three numbers of a series (e.g. "2," "4" and "6") and the answer lever would carry the next number of that series ("8").

To teach the use of money, three coins such as two dimes and a nickel can be displayed on the respective actuator pieces and a quarter displayed on the answer lever.

Referring again to the lever 56, this lever will remain in obstructing position so long as any one of the answer bearing levers is in the display position. Thus it becomes necessary for the child to not only remove a previous set of actuator pieces but also to reset the answer bearing lever from its display position back to its normal position before he will be able to insert new actuator pieces into the apparatus. It will be apparent that if new actuator pieces were inserted into the apparatus without first resetting a previously projected answer bearing lever from its display position back to its normal position, that a second answer bearing lever, actuated by the new set of actuator pieces, could move beneath the answer bearing lever already in the display position and would be covered thereby so that the wrong answer would appear. The blocking lever 56 prevents this condition from occurring.

It will be apparent from the foregoing that the actuator pieces must be inserted into the apparatus in their proper order, or no answer will appear in the display window.

Where dual actuator pieces such as that shown in the drawings, are utilized, it is desirable that only those legends which refer to the actuator cams that are in operative position, should be visible. Accordingly, the housing of the apparatus is provided with a shield 75 of Z-section which covers the legends applicable to the inoperative cams.

It will be understood that single actuator pieces each with a single cam and a single problem component legend, can be employed within the scope of the invention. Dual actuator pieces are preferred because of reduction in manufacturing costs, saving in space, etc.

Another application of the apparatus is somewhat similar to a cross word puzzle in that three sections of a figure (e.g. a picture of a dog) can be displayed on the respective actuator pieces which, as the legend bearing heads thereof come together in the assembly of actuator pieces in the apparatus, will assemble the three sections to give the complete picture of the animal, and the word designation for the animal (e.g. "dog") can be displayed on the answer lever. Other applications of the invention will suggest themselves from the foregoing.

I claim:

1. An educational apparatus comprising: a housing including a front wall having a display window and a slide slot, and including an end having a mouth to receive actuator pieces, said mouth communicating with said slot; a plurality of actuator pieces each having slide parts, an actuator wedge, and a head bearing a problem legend; a slideway in the back of said housing communicating with said mouth, said slideway and slot cooperating with said slide parts to guide the actuator piece in a fixed path of actuation movement in which the piece may be manually pushed from one end toward the opposite end of the housing; a plurality of answer-legend-bearing levers pivoted in said housing for swinging movement in respective planes parallel to said front wall; and over-center operable spring means acting on said levers to normally hold them yieldingly in retracted positions concealed within the housing and operable on a selected lever when the latter is moved past on-center position with relation to said spring means, to propel said selected lever to a display position in which its answer legend is visible through said window, said levers having respective camming edges arranged to be engaged by said actuator wedges as said actuator pieces are moved in said paths of actuation movement, and said actuator pieces being related in groups wherein the actuator wedges of respective pieces are arranged to selectively register with the camming edge of a common answer-bearing lever with a progressive actuation of the lever toward its display position, such that the action of a preceding piece against the lever is required and effective for adjusting the lever to a position in which it can be acted upon by a succeeding piece, and the action of the last piece of the group is required and effective for moving the lever past said on-center position, whereby to cause the lever to be propelled to said display position.

2. Apparatus as defined in claim 1, wherein the heads of said actuator pieces are arranged to be disposed externally of said front wall while one of said slide parts consists in a neck extending through said slot and between said head and wedge.

3. Apparatus as defined in claim 1, wherein each actuator piece has a plurality of actuator wedges in staggered relation to one another, and has a plurality of problem legends displayed on the head thereof.

4. Apparatus as defined in claim 1, wherein each actuator piece has a plurality of actuator wedges in staggered relation to one another and projecting from opposite sides of said slide parts, and has a plurality of problem legends displayed on the head thereof.

5. Apparatus as defined in claim 1 wherein said levers have respective tail sections each provided with oppositely inclined bearing edges, and wherein said spring means comprises a plurality of individual leaf springs each having an actuator tip bearing against the tail section of a respective lever.

6. An educational apparatus comprising: a housing including a front wall having a display window and at one end having a mouth to receive actuator pieces; a plurality of actuator pieces each having slide means, an actuator part, and a head bearing a problem legend; a slideway in said casing communicating with said mouth, said slideway cooperating with said slide means to guide the actuator piece in a fixed path of movement in which the piece may be manually pushed from one end toward the opposite end of the housing; a plurality of answer-legend-bearing levers pivoted in said housing for swinging movement in respective planes parallel to said front wall; and spring means acting on said levers and operable on a selected lever when the latter is moved to a release position, to propel said selected lever to a display position in which its answer legend is visible through said window, said levers having respective camming edges arranged to be engaged by said actuator parts as said actuator pieces are moved in said paths of actuation movement, and said actuator pieces being related in groups wherein the actuator parts of respective pieces are arranged to selectively register with the camming edge of a common answer-bearing lever with a progressive actuation of the lever toward its display position, such that the action of a preceding piece against the lever is required and effective for adjusting the lever to a position in which it can be acted upon by a succeeding piece, and the action of the last piece of the group is required and effective for moving the lever past said on-center position, whereby to cause the lever to be propelled to said display position.

7. Apparatus as defined in claim 6, including means actuated by movement of an answer bearing lever to its display position for blocking the entry of additional actuator pieces through said mouth into the housing.

8. An educational apparatus comprising: a housing including a front wall having a display window and a slide slot, and having a mouth to receive actuator pieces, said slot communicating with said mouth; a plurality of actuator pieces each having slide means, an actuator projection, and a head bearing a problem legend; said slot cooperating with said slide means to guide the actuator piece in a fixed path of movement in which the piece may be manually pushed from one end toward the opposite end of the housing; a plurality of answer-bearing levers pivoted in said housing for swinging movement in respective planes parallel to said front wall; and over-center operable spring means acting on said levers to normally hold them yieldingly in retracted positions concealed within the housing and operable on a selected lever, when the latter is moved past an on-center position with relation to said spring means, to propel said selected lever to a display position in which its answer legend is visible through said window, said levers having respective camming edges arranged to be engaged by said actuator projections as said actuator pieces are moved in said paths of actuation movement, and said actuator pieces being related in groups wherein the actuator projections of respective pieces are arranged to selectively register with the camming edge of a common answer-bearing lever with a progressive actuation of the lever toward its display position, such that the action of a preceding piece against the lever is required and effective for adjusting the lever to a position in which it can be acted upon by a succeeding piece, and the action of the last piece of the group is required and effective for moving the lever past said on-center position, whereby to cause the lever to be propelled to said display position.

9. Apparatus as defined in claim 8, wherein said slide means of each actuator piece comprises a flat neck bridging between the head and the actuator projection, said neck being received and guided in said slide slot, said head being disposed externally of the housing, and said actuator projection being disposed within the housing when the actuator piece is in an operative position.

10. An educational apparatus comprising: a housing including a front wall having a display window and a slide slot, and including an end having a mouth to receive actuator pieces; a plurality of actuator pieces each having slide parts, an actuator wedge, and a head bearing a problem legend; a slideway in the back of said casing communicating with said mouth, said slideway and slot cooperating with said slide parts to guide the actuator piece in a fixed path of movement in which the piece may be manually pushed from one end toward the opposite end of the housing; a plurality of levers; a common pivot on which said levers are pivoted in said housing for swinging movement in respective planes parallel to said front wall, each of said levers including an answer-legend bearing head, an arm connecting said head to said pivot, and a camming tail portion projecting in the opposite direction from said pivot; and a plurality of over-center operable leaf springs acting on said tail portions of said levers to normally hold them yieldingly in retracted positions concealed within the housing and each operable on a respective lever, when the latter is selectively moved past an on-center position with relation to said spring means, to propel the selected lever to a display position in which its answer legend is visible through said window, said levers having respective camming edges arranged to be engaged by said actuator wedges as said actuator pieces are moved in said paths of actuation movement, and said actuator pieces being related in groups wherein the actuator wedges of respective pieces are arranged to selectively register with the camming edge of a common answer-bearing lever with a progressive actuation of the lever toward its display position, such that the action of a preceding piece against the lever is required and effective for adjusting the lever to a position in which it can be acted upon by a succeeding piece, and the action of the last piece of the group is required and effective for moving the lever past said on-center positon, whereby to cause the lever to be propelled to said display position.

11. Apparatus as defined in claim 10, including a blocking arm pivoted to said front wall within said housing alongside said slot and normally in non-obstructing relation thereto, and a tail plate on said blocking lever, positioned to be engaged by the tail portion of a lever that has moved to the display position, and adaped when thus engaged, to shift said blocking arm to a position obstructing the mouth of said slot.

12. Apparatus as defined in claim 10, including a reset lever pivoted in said common pivot, and a reset finger carried by said reset lever and projecting across the planes of said answer-legend-bearing levers for engagement therewith for resetting back to retracted position any lever that has been projected to display position, said front wall having an arcuate slot, concentric with said pivot, through which said finger extends for manual engagement.

References Cited in the file of this patent
UNITED STATES PATENTS

| | | |
|---|---|---|
| 792,801 | Steele | June 20, 1905 |
| 1,350,338 | Richards | Aug. 24, 1920 |
| 1,619,160 | Steele | Mar. 1, 1927 |
| 1,629,635 | Parsons | May 24, 1927 |
| 2,586,564 | Rinde | Feb. 19, 1952 |